Nov. 28, 1933.                C. A. CAMPBELL                1,936,827
                                 AIR BRAKE
                              Filed Nov. 7, 1929            2 Sheets-Sheet 2
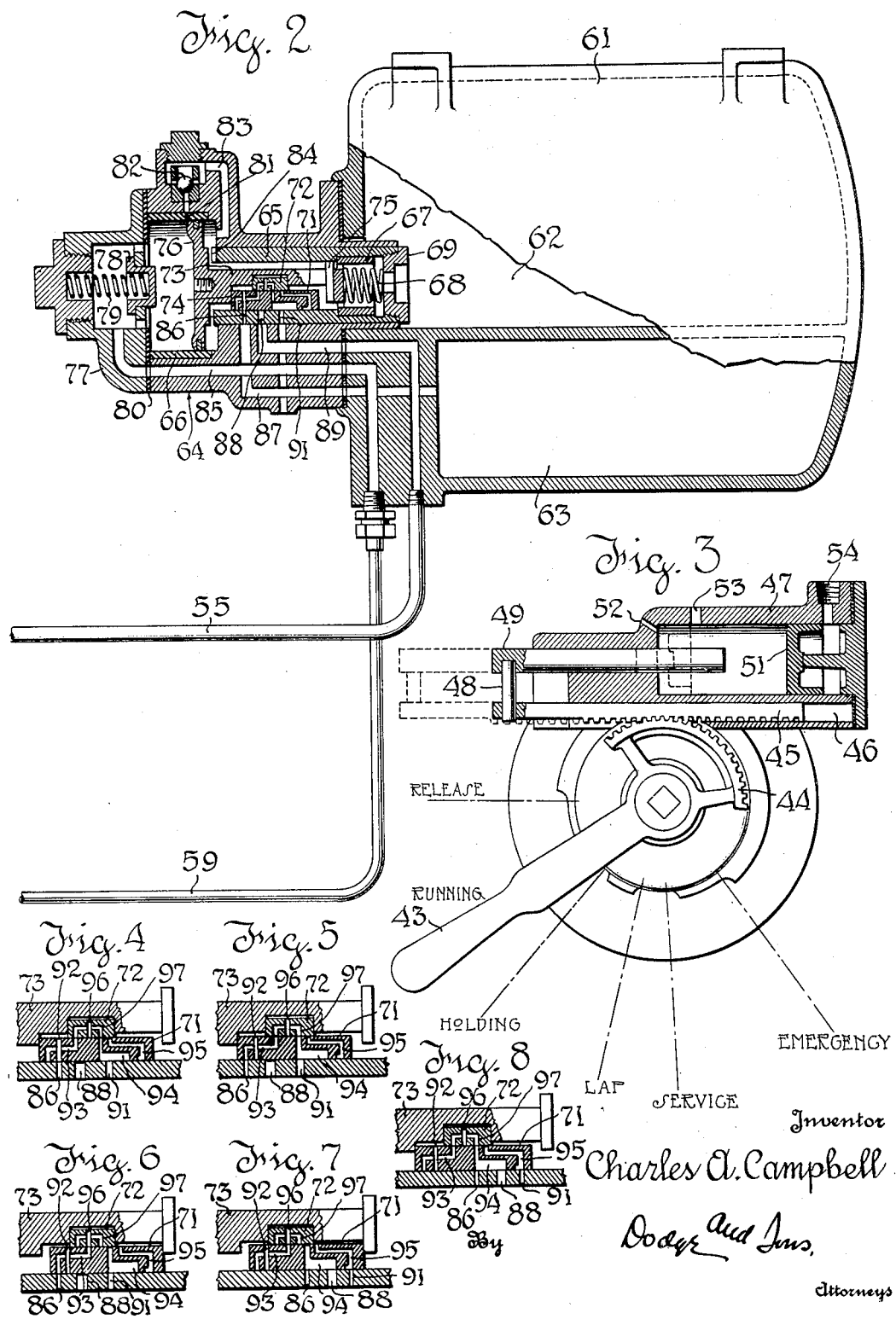

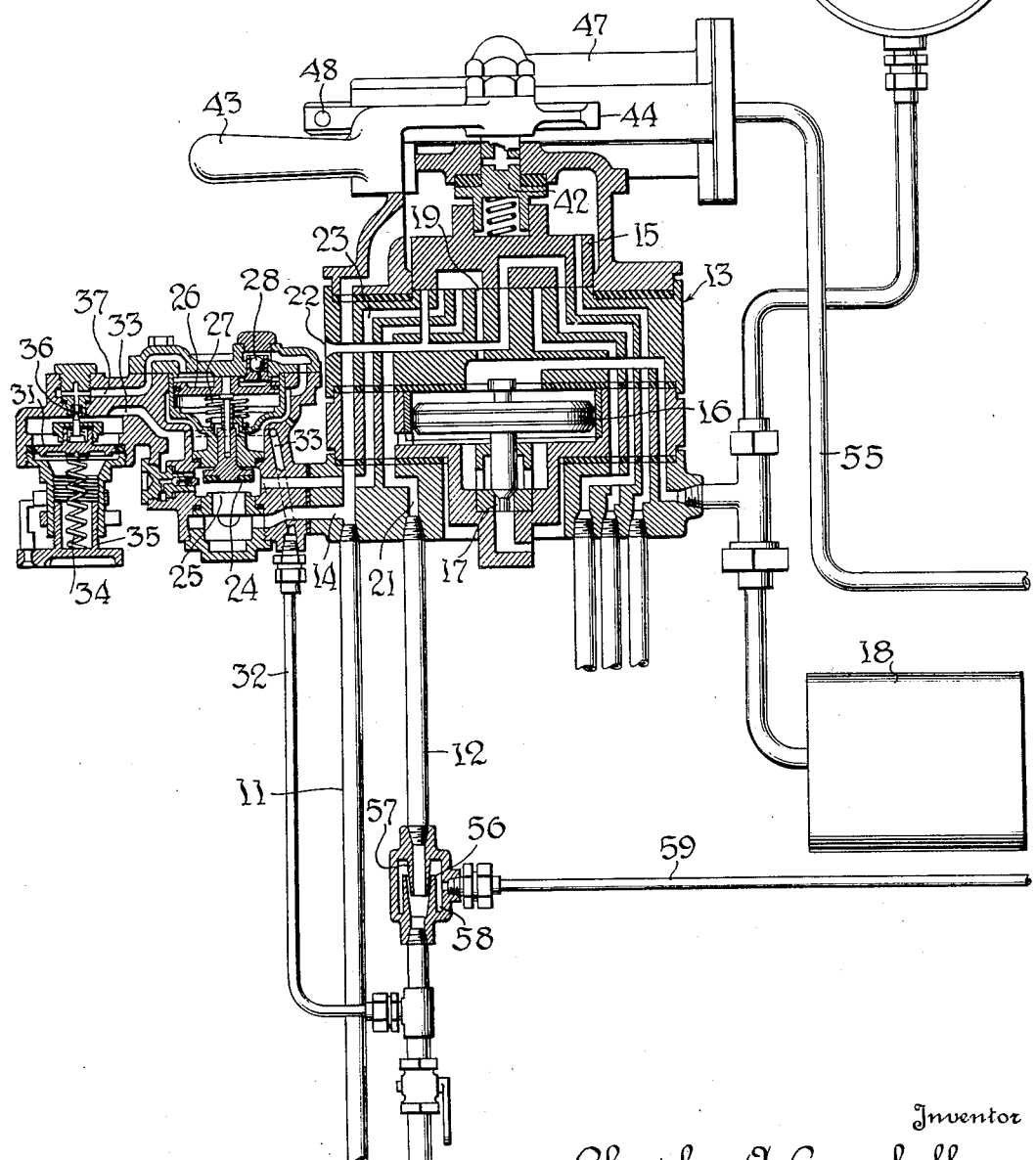

Patented Nov. 28, 1933

1,936,827

UNITED STATES PATENT OFFICE 1,936,827

AIR BRAKE

Charles Albert Campbell, Watertown, N. Y., assignor to The New York Air Brake Company, a corporation of New Jersey Application November 7, 1929. Serial No. 405,485

21 Claims. (Cl. 303—66)

This invention relates to air brakes and particularly to means for ensuring satisfactory service and emergency applications by the opening of a conductor's discharge valve.

The increasing length of trains has led to the use of large capacity feed valves. If a conductor's discharge valve be opened while the engineer's brake valve is in running or holding position, the feed valve opens and delivers air at such a rapid rate as to interfere with the reduction of brake pipe pressure at the forward end of the train.

If the conductor's valve is opened wide, to initiate an emergency application, the vent valves on the cars function serially and ensure that the emergency reduction travels to the front end of the train, but when the front valves close, the feed valve raises brake pipe pressure at the front of the train so that the front brakes release. Break-in-twos often result.

If the conductor's valve is opened partially to initiate a service application, the local quick service venting at the triple valves is slight, so that the pressure reduction in the brake pipe is neutralized by the feed valve inflow before the brakes apply at the forward end of the train. Hence rear brakes are applied with full force while brakes toward the forward portion have a tapering reduction of braking power and those adjacent the locomotive will fail to apply, thus creating a very undesirable condition.

In the case of either emergency or service applications, the difficulty may be obviated by lapping the engineer's brake valve, but the engineer often fails to do so.

In a prior Patent No. 1,682,482, granted August 28, 1928, I describe and claim a device which is automatically actuated when an emergency vent valve on the locomotive functions, and which moves the engineer's brake valve to a non-feeding position. This overcomes the difficulty so far as emergency applications are concerned.

The present invention provides a device which will perform the same function in response to service as well as emergency reductions of brake pipe pressure. As service reductions are neutralized before they reach the locomotive, the device must not be dependent for its action on a brake pipe reduction, and to meet this requirement the device is caused to operate as the result of a rapid flow in the brake pipe from the locomotive toward the train. It is so arranged that it will respond to service reductions and does not interfere with the normal functions of the engineer's brake valve.

In the drawings, which show the preferred embodiment of the invention,—

Fig. 1 is a vertical axial section of the engineer's brake valve and feed valve, together with the lapping motor and connected piping.

Fig. 2 is a view, chiefly in vertical axial section of the motor-controlling valve with its associated reservoirs, and connected piping.

(Figs. 1 and 2 are drawn to the same scale and are complementary views which taken together show the entire device)

Fig. 3 is a plan view of the engineer's brake valve with the applied valve-shifting motor shown in section.

Fig. 4 is a diagrammatic view of the slide and graduating valve shown in Fig. 2, in normal charging position.

Fig. 5 is a similar view showing retarded charging position.

Fig. 6 is a similar view showing equalization after retarded charging.

Fig. 7 is a similar view showing the position during a service (also emergency) reduction.

Fig. 8 is service lap position.

In the drawings, a convention familiar in the air brake art has been adopted: the ports are all shown in a single plane to render their action visible in a single view. It will be understood that the ports can be more compactly arranged and manufacture may be simplified by other arrangement of the ports.

Referring first to Figs. 1 and 2, the main reservoir pipe 11 and the brake pipe 12 are connected to the engineer's brake valve, indicated generally by the numeral 13. Pipe 11 leads to passage 14 which as usual communicates with the space above the rotary valve 15.

The engineer's brake valve is illustrated as an ordinary six-position, equalizing discharge type of valve and may be of any suitable type. The more important parts are, equalizing piston 16, discharge valve 17, equalizing reservoir 18, preliminary exhaust port 19, brake pipe port 21 (communicating with brake pipe 12) exhaust passage 22, feed port 23.

The feed valve is illustrated as of the large capacity type described and claimed in my prior application Serial No. 221,810, filed Sept. 24, 1927 and consequently not here claimed. The valve 24 coacting with seat 25 controls flow from the main reservoir port 14 to feed port 23. The valve 24 is actuated by piston 26 and opposing spring 27. The space above piston 26 has a restricted vent 28, and the pressure acting on the piston is controlled by a pressure controlled valve which, under the control of brake pipe pressure, admits air at rates greater or less than the discharge capacity of vent 28.

The pressure controlled valve includes a diaphragm 31 which is subject on its upper face to brake pipe pressure communicated through pipe 32 and passage 33. The diaphragm 31 is loaded by spring 34 having an adjustable spring-seat 35 which is threaded in the valve body. The spring 34 tends to close and pressure acting downward on diaphragm 31 tends to open a needle valve 36 controlling flow from the brake pipe to the space above piston 26 by way of passage 37.

Any feed valve may be used, but the difficulty which the invention seeks to correct arises particularly with large capacity valves.

The engineer's brake valve illustrated has six positions; "release" in which main reservoir air is fed to the brake pipe to release the train brakes; "running" in which main reservoir air is fed to the brake pipe through the pressure reducing feed valve; "holding" which is the same as running except that the engine and tender brakes are retained; "lap" in which all ports are closed; "service" in which air is vented from the equalizing chamber and reservoir to cause the equalizing discharge mechanism to function; and "emergency" in which a direct exhaust from the brake pipe is opened. The operation of the engineer's brake valve is too well known to require detailed description. The invention is applicable, without change, to other types of engineer's brake valve, for example, the well known five position type lacking the holding position.

The rotary valve 15 of the engineer's brake valve is turned by a stem 42 swiveled in the cap of the brake valve and carrying a handle 43 of usual form. The handle carries a gear sector 44 which meshes with a rack 45 slidable in a guideway 46, the guideway being formed in the side of the motor cylinder 47 (see Fig. 3). The rack 45 is connected by pin 48 with piston rod 49. The piston rod may enter into thrust engagement with piston 51 and the parts are so proportioned that in moving to release position the rod 49 forces piston 51 to its limiting right hand position, while at the limit of left hand motion of the piston the handle 43 will be in lap position, and free to be moved manually further to service and emergency positions.

The space to the left of the piston 51 is vented to atmosphere at all times by vent 52. An exhaust port 53 is overtraveled by piston 51 at its left hand limit of motion and then serves to vent the working space to the right of the piston. The right end of cylinder 47 has a supply connection 54 to which a pipe 55 leads.

In the brake pipe 12 and preferably between the brake valve 13 and the branch pipe 32 to the feed valve, is an ejector device, comprising a combining tube 56 and nozzle 57 surrounded by a chamber 58 to which pipe 59 is connected. The parts are so arranged that flow above a critical velocity from the brake valve 13 to the brake pipe will establish a reduced pressure in chamber 58. Below this critical velocity pressure in the pipe 59 will approximate brake pipe pressure.

Referring now to Fig. 2, a shell 61 is divided into two closed chambers, a balancing chamber 62 and a motive fluid reservoir 63. Bolted to the end of shell 61 is a controlling valve, which in its mechanical aspects resembles a triple valve.

The body 64 of the controlling valve contains a valve seat bushing 65 and a cylinder bushing 66. At the right or inner end of bushing 65 there is a slidable retard stop 67 urged to the left by spring 68 which seats against threaded plug 69. The stop 67 and plug 69 are ported so that the chamber 62 communicates freely with the interior of valve bushing 65.

Slidable on the valve seat formed within bushing 65 is a slide valve 71 and riding on valve 71 is a graduating valve 72. The valve 72 is closely confined in a notch in the stem 73 while the valve 71 has slight lost motion relatively to the stem, between shoulders 74 and 75. The stem 73 is fixed to piston 76 which works in cylinder bushing 66. The front cap 77 carries a graduating stop 78 with spring 79 which arrests the leftward motion of the piston. Between the cap 77 and body is a gasket 80, analogous to those used in triple valves.

The retard stop 67 engages the stem 73 and arrests the piston in a position just to the right of feed port 81. This port leads past a ball check valve 82 to a passage 83 which normally communicates freely with the interior of bushing 65. However, when piston 76 is forced to the right overpowering the retard stop, the piston seats against the left end of bushing 65, restricting the flow to the capacity of a small notch 84 formed in the end of the bushing.

The pipe 59 leads by way of passage 85 to the interior of the front cap and to the space at the left of piston 76. The seat of valve 71 has three ports. The first port 86 connects by passage 87 with chamber 63. The second port 88 connects by passage 89 and pipe 55 with the right end of cylinder 47. The third port 91 leads to atmosphere.

The slide valve 71 is ported as follows: There is a through port 92 which registers with port 86 when piston rod 73 moves to the right and is arrested by retard stop 67. (See Fig. 4.) Port 92 is not controlled by the graduating valve 72. There is a through port 93, which registers with port 86 when rod 73 moves to its extreme right hand position overpowering retard stop 67. (See Fig. 5.) The slide valve 71 is left in this position when the retard stop returns the piston rod 73 because of the lost motion between the valve 71 and the rod. (See Fig. 6.) There is a through port 94 having an elongated opening in the lower face of valve 71 which registers with exhaust port 91 in the positions of Figs. 4, 5 and 6, already described, and whose elongated opening bridges ports 88 and 91 when piston 76 overpowers graduating stem 78 (Fig. 7). When the stem shifts the piston to the right the lost motion between the stem 73 and valve 71 leaves the valve in the same position (Fig. 8). There is a through port 95 which in the positions of Figs. 7 and 8, registers with exhaust port 91.

The graduating valve 72 has a through port 96 which registers with port 93 when valve 72 is shifted to the left on valve 71 (Figs. 6 and 7) and which is blanked when the valve 72 is shifted to the right (Figs. 4, 5 and 8). There is also a port 97 having two connected openings in the lower face of the graduating valve so located that when valve 72 is to the right on valve 71, port 97 connects ports 93 and 94 (Figs. 4, 5 and 8). These ports are disconnected when the valve 72 is shifted to the left on valve 71 (Figs. 6 and 7). The valve 72 also closes the upper end of port 95 when shifted to the right and opens said port when shifted to the left relatively to valve 71.

The operation of the device can now be traced under the various conditions encountered.

*Charging brake system initially or after emer-*

*gency or heavy service.*—The engineer moves the brake valve to full release position admitting air at main reservoir pressure to the brake pipe. The brake pipe and auxiliary reservoirs etc. will be charged in the usual manner. The ejector will be flooded so that the high pressure in the brake pipe will penetrate to chamber 58 and flow will occur through pipe 59 to the space to the left of piston 76. As the differential maintained by retard spring 67 is only about three pounds per square inch, the piston will move to the right hand limit and the slide and graduating valve will be positioned as in Fig. 5 (restricted recharge). Air flows to chamber 62 by port 81, passage 83 and restricting groove 84, while chamber 63 is vented to atmosphere by passage 87, ports 86, 93, 97, 94 and 91. The piston 51 is inert, port 88 being closed.

*Normal charge after retarded recharge.*—When the engineer shifts his brake valve from "release" to "running" position, as he must do to prevent overcharging the auxiliary reservoirs, brake pipe pressure in chamber 58 drops to normal and spring 68 shifts the piston 76 to the left, the valves 71 and 72 assuming the positions of Fig. 6. Thus the piston 26 moves away from bushing 65 and charging flow is no longer restricted to the capacity of groove 84. The exhaust from chamber 63 is closed and the pressures in chambers 62 and 63 equalize through ports 96, 93, 86 and passage 87. The relative volumes are so chosen that the overcharge in chamber 62 will approximately charge chamber 63, to the end that pressures in the two chambers will equalize slightly below normal brake pipe pressure. Any deficiency will be made up by normal charging flow through port 81. It will be observed that, in this position also, port 88, is closed.

*Service initiated at engineer's brake valve.*—If the engineer moves his brake valve to service position and then to lap, the equalizing discharge valve functions in the usual way to make a gradual reduction of brake pipe pressure. This reduction penetrates to the space at the left of piston 76 which moves to the left, under the influence of pressure in chamber 62, overpowers spring 79 and seats against gasket 80. This positions the valve 71 and 72, as indicated in Fig. 7. Port 94 then bridges ports 86 and 88 and air from chamber 63 flows to cylinder 47 and shifts piston 51 to its left hand limit of motion. As this could move the handle 43 only to lap position, where the handle is assumed already to be, the movement is without function except to vent chamber 63 to atmosphere through port 53. At the same time chamber 62 is being exhausted to atmosphere at a service rate through ports 95 and 91. Ultimately the reduction of pressure in chamber 62 will be such that spring 79 will shift piston 76 to the right and the valves 71 and 72 will be in service lap position (Fig. 8).

*Service lap.*—As indicated in Fig. 8, ports 86 and 88 remain connected, but exhaust port 91 is blanked. Obviously successive service reductions may be made.

*Release in running position, after a light service application.*—A light service application can be released by moving the engineer's brake valve to running position. The flow through the nozzle 57 may reduce the pressure on piston 76 sufficiently to cause valve 72 to move from lap to service, but as chamber 63 is empty there is no function. As the flow through the nozzle decreases, pressure will build up to shift piston 76 to the right until arrested by retard stop 67 (see Fig. 4). Then chamber 62 charges by normal flow through port 81 and chamber 63 is charged from chamber 62 by flow through ports 92 and 86, all other ports being blanked.

*Emergency initiated at engineer's brake valve.*—The parts function as described in service, above, except that piston 76 remains against gasket 80 until pressure is exhausted in chamber 62.

*Service initiated at conductor's valve.*—If the conductor opens this valve to produce a service reduction while the engineer's brake valve is in running or holding position, the feed valve will start to counteract the pressure drop. Hence there will be rapid flow through nozzle 57. This will create an ejector action which reduces the pressure at the left of piston 76. Consequently this moves to service position, positioning valves 71 and 72, as shown in Fig. 7. As already described, air then flows from chamber 63 to cylinder 47, shifting piston 51 which engages rod 49 and moves the brake valve handle 43 to lap position. Then chamber 63 is vented through port 53. The shifting of the engineer's brake valve cuts off the feed, and the service brake application will travel to the front of the train so that all brakes will apply.

*Emergency initiated by conductor's valve.*—As already explained the emergency vent action will travel to the front of the train. As the feed valve opens, the increased flow through the ejector nozzle or the drop in brake pipe pressure, or both, will reduce the pressure to the left of piston 76, so that the piston will function as just described under service, causing the lapping of the engineer's brake valve.

*Effect on engineer's brake valve during release.*—After the device has functioned to shift the engineer's brake valve to lap position, chamber 63 will be vented through port 53. It is consequently incapable of again functioning until chamber 63 is recharged and this can occur only as an incident to the recharge of the brake system. In this way interference with the normal brake releasing functions of the engineer's brake valve is precluded.

The invention is capable of various embodiments and no limitation to the specific structure is implied. While the special valve device and its related chambers are illustrated as a unit, separate from the brake valve, this obviously is not necessary, and the two might be mounted on a common support or have certain of their cast parts in common, this being a matter largely of design. While it is preferable to shift the engineer's brake valve to lap position, any non-feeding position might be used in particular cases.

What is claimed is,—

1. The combination of a brake system including the usual brake pipe, feed valve and engineer's brake valve, having feeding and non-feeding positions; an ejector pump interposed in the brake pipe and arranged to be actuated by rapid flow in said pipe away from said brake valve, to establish a subnormal pressure; motor means, operable to shift said brake valve to a non-feeding position; and means subject to said subnormal pressure and rendered active thereby to cause said motor to operate.

2. The combination of a brake system including the usual brake pipe, feed valve and engineer's brake valve, having feeding and non-feeding positions; an ejector pump interposed in the brake pipe and arranged to be actuated by rapid flow in said pipe away from said brake valve, to establish a subnormal pressure; motor means operable to shift said brake valve to a non-feeding position; means subject to said subnormal pressure and rendered active thereby to cause the motor means to shift said brake valve to a non-feeding position; means for rendering the motor means inoperative after it has functioned; and means for restoring the operativeness of the motor means upon recharge of the system.

3. The combination of a brake system including the usual brake pipe, feed valve and engineer's brake valve, having feeding and non-feeding positions; an ejector pump interposed in the brake pipe and arranged to be actuated by rapid flow in said pipe away from said brake valve, to establish a subnormal secondary pressure; motor means operable to shift said brake valve to a non-feeding position; means conditioned for operation by charging during charging of the brake system, said means being subject to said subnormal secondary pressure and brought into action upon the occurrence thereof to supply motive fluid to said motor means; and means active to discharge the first-named means after the latter has functioned to supply motive fluid to said motor means, whereby it is prevented from again functioning until the brake system is recharged.

4. The combination of a brake system including the usual brake pipe, feed valve and engineer's brake valve, having feeding and non-feeding positions; a pneumatic motor operable to shift the engineer's brake valve to a non-feeding position; a device operable by rapid flow in the brake pipe to establish a subnormal pressure in a space in open communication with the brake pipe; a balancing reservoir; a piston interposed between said space and said reservoir, said piston controlling a charging passage to said reservoir; a second reservoir; valve means operated by said piston, and controlling the charging of the second reservoir from the first and the supply of pressure fluid from the second reservoir to said pneumatic motor to operate the latter; and means operative at the end of the working stroke of the motor to vent the motor and said second reservoir.

5. The combination of a brake system including the usual brake pipe, feed valve and engineer's brake valve, having feeding and non-feeding positions; a pneumatic motor operable to shift the engineer's brake valve to a non-feeding position; a device operable by rapid flow in the brake pipe to establish a subnormal pressure in a space in open communication with the brake pipe; a balancing reservoir; a piston interposed between said space and said reservoir, said piston controlling a charging passage to said reservoir; a second reservoir; valve means operated by said piston, and controlling the charging of the second reservoir from the first, the venting of each reservoir and the supply of pressure fluid from the second reservoir to said pneumatic motor to operate the latter; and means operative at the end of the working stroke of the motor to vent the motor and said second reservoir.

6. The combination of a brake system including the usual brake pipe, feed valve and engineer's brake valve, having feeding and non-feeding positions; a pneumatic motor operable to shift the engineer's brake valve to a non-feeding position; a device operable by rapid flow in the brake pipe to establish a subnormal pressure in a space in open communication with the brake pipe; a balancing reservoir; a piston interposed between said space and said reservoir, said piston controlling a charging passage to said reservoir; a second reservoir; valve means operated by said piston, and controlling the charging of the second reservoir from the first and the supply of pressure fluid from the second reservoir to said pneumatic motor to operate the latter; a yielding retard stop and a yielding graduating stop controlling reverse movements of said piston; and means operative at the end of the working stroke of the motor to vent the motor and said second reservoir.

7. The combination of a brake system including the usual brake pipe, feed valve and engineer's brake valve, having feeding and non-feeding positions; a pneumatic motor operable to shift the engineer's brake valve to a non-feeding position; a device operable by rapid flow in the brake pipe to establish a subnormal pressure in a space in open communication with the brake pipe; a balancing reservoir; a piston interposed between said space and said reservoir, said piston controlling a charging passage to said reservoir; a second reservoir; a valve and a related graduating valve operated by said piston, one having lost motion relatively thereto, said valves controlling the charging of the second reservoir by the first, the venting of each reservoir and the supply of pressure fluid from the second reservoir to said pneumatic motor to operate the latter; a yielding retard stop and a yielding graduating stop controlling reverse movements of said piston; and means operative at the end of the working stroke of the motor to vent the motor and said second reservoir.

8. The combination of a brake system including the usual brake pipe, feed valve and engineer's brake valve, having feeding and non-feeding positions; a pneumatic motor operable to shift the engineer's brake valve to a non-feeding position; a device operable by rapid flow in the brake pipe to establish a subnormal pressure in a space in open communication with the brake pipe; a balancing reservoir; a piston interposed between said space and said reservoir, said piston controlling a charging passage to said reservoir; a second reservoir; a valve and a related graduating valve operated by said piston, one having lost motion relatively thereto, said valves controlling the charging of the second reservoir by the first and the supply of pressure fluid from the second reservoir to said pneumatic motor to operate the latter; a yielding retard stop and a yielding graduating stop controlling reverse movements of said piston; and means operative at the end of the working stroke of the motor to vent the motor and said second reservoir.

9. The combination of a brake system including the usual brake pipe, feed valve and engineer's brake valve, having feeding and non-feeding positions; a pneumatic motor operable to shift the engineer's brake valve to a non-feeding position; a device operable by rapid flow in the brake pipe to establish a subnormal pressure in a space in open communication with the brake pipe; a balancing reservoir; a piston interposed between said space and said reservoir, said piston controlling a charging passage to said reservoir and being provided with means for restricting the charging of said reservoir when in its extreme inward position; a second reservoir; a yielding retard stop which tends to arrest said piston in normal charging position and which when overpowered permits it to move to restricted charging position; a yielding graduating stop which is overpowered in application positions and which is adapted to shift the piston to lap position upon approximate equalization of pressure; a valve and a related graduating valve operated by said piston, one valve having lost motion relatively thereto, said valves coacting to charge the second reservoir from the first in normal charging position, to vent the second reservoir to atmosphere in restricted charging position and to charge the second reservoir from the first in normal charging after restricted charging, to connect the second reservoir with said pneumatic motor and to vent the first reservoir to atmosphere at a service rate in service position and to connect the second reservoir with said motor and close all other ports in lap position; and means operative at the end of the working stroke of the pneumatic motor to vent the motor and said second reservoir.

10. The combination of an automatic air brake system including an engineer's brake valve, feed valve and normally charged brake pipe; means for deriving energy from rapid flow in the brake pipe in a direction away from the engineer's brake valve; and means rendered operative by such energy and serving when operative to suspend the feeding action of the feed valve.

11. The combination of an automatic air brake system including an engineer's brake valve, feed valve and normally charged brake pipe; means for deriving energy from rapid flow in the brake pipe in a direction away from the engineer's brake valve; means rendered operative by such energy and serving when operative to suspend the feeding action of the feed valve; and means rendered effective by functioning of the second named means during an application, to render the second named means inoperative during recharge of the system.

12. The combination of an automatic air brake system including an engineer's brake valve, feed valve and normally charged brake pipe; means for deriving energy from rapid flow in the brake pipe in a direction away from the engineer's brake valve; and means rendered operative by such energy and serving when operative to shift the engineer's brake valve to a non-feeding position.

13. The combination of an automatic air brake system including an engineer's brake valve, feed valve and normally charged brake pipe; means for deriving energy from rapid flow in the brake pipe in a direction away from the engineer's brake valve; means rendered operative by such energy and serving when operative to shift the engineer's brake valve to a non-feeding position; and means rendered effective by functioning of the second named means during an application, to render the second named means inoperative during recharge of the system.

14. The combination of an automatic air brake system, including an engineer's brake valve, feed valve and normally charged brake pipe; a motor operable to shift the engineer's brake valve to a non-feeding position; a reservoir charged as an incident to the charging of the brake system, and connected to supply motive fluid to said motor; valve means controlling the connection between said reservoir and motor and normally closed to maintain said motor inert; means for deriving energy from rapid flow in the brake pipe away from the engineer's brake valve; and means for applying such energy to open said valve means, and cause said motor to operate.

15. The combination of an automatic air brake system, including an engineer's brake valve, feed valve and normally charged brake pipe; a motor operable to shift the engineer's brake valve to lap position; a reservoir charged as an incident to the charging of the brake system, and connected to supply motive fluid to said motor; valve means controlling the connection between said reservoir and motor and normally closed to maintain said motor inert; means for deriving energy from rapid flow in the brake pipe away from the engineer's brake valve; and means for applying such energy to open said valve means, and cause said motor to operate.

16. The combination of an automatic air brake system, including an engineer's brake valve, feed valve and normally charged brake pipe; a motor operable to shift the engineer's brake valve to a non-feeding position; a reservoir charged as an incident to the charging of the brake system, and connected to supply motive fluid to said motor; valve means controlling the connection between said reservoir and motor and normally closed to maintain said motor inert; means for deriving energy from rapid flow in the brake pipe away from the engineer's brake valve; and means for applying such energy to open said valve means, and cause said motor to operate; and means rendered effective by the operation of said motor to vent said reservoir and thus preclude a second operation of the motor until the system is recharged.

17. The combination of an automatic air brake system, including an engineer's brake valve, feed valve and normally charged brake pipe; a motor operable to shift the engineer's brake valve to lap position; a reservoir charged as an incident to the charging of the brake system, and connected to supply motive fluid to said motor; valve means controlling the connection between said reservoir and motor and normally closed to maintain said motor inert; means for deriving energy from rapid flow in the brake pipe away from the engineer's brake valve; and means for applying such energy to open said valve means, and cause said motor to operate; and means rendered effective by the operation of said motor to vent said reservoir and thus preclude a second operation of the motor until the system is recharged.

18. The combination of claim 10 further characterized in that the last named means is normally subject to brake pipe pressure and is capable of being rendered operative by a reduction thereof.

19. The combination of claim 11 further characterized in that the second named means is normally subject to brake pipe pressure and is capable of being rendered operative by a reduction thereof.

20. The combination of claim 12 further characterized in that the last named means is normally subject to brake pipe pressure and is capable of being rendered operative by a reduction thereof.

21. The combination of claim 13 further characterized in that the second named means is normally subject to brake pipe pressure and is capable of being rendered operative by a reduction thereof.

CHARLES ALBERT CAMPBELL.